United States Patent
Zalmanovitch et al.

(10) Patent No.: US 9,049,589 B2
(45) Date of Patent: Jun. 2, 2015

(54) DYNAMICALLY ADJUSTING A DATA USAGE PLAN BASED ON DATA USAGE STATISTICS

(71) Applicant: Microsoft Corporation, Redmond, WA (US)

(72) Inventors: Gil Zalmanovitch, Seattle, WA (US); Gregory James Scott, Seattle, WA (US); Shai Guday, Redmond, WA (US); Alec Garvin Kwok, Redmond, WA (US); Yue Jiang, Redmond, WA (US); Kenneth Vincent Ma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/721,032

(22) Filed: Dec. 20, 2012

(65) Prior Publication Data

US 2013/0196626 A1 Aug. 1, 2013

Related U.S. Application Data

(60) Provisional application No. 61/696,472, filed on Sep. 4, 2012, provisional application No. 61/591,503, filed on Jan. 27, 2012, provisional application No. 61/591,509, filed on Jan. 27, 2012.

(51) Int. Cl.
*H04M 11/00* (2006.01)
*H04W 4/26* (2009.01)
(Continued)

(52) U.S. Cl.
CPC ............... *H04W 4/26* (2013.01); *H04W 24/02* (2013.01); *H04L 43/04* (2013.01); *H04L 43/045* (2013.01);
(Continued)

(58) Field of Classification Search
CPC ............ H04M 15/66; H04M 15/8044; H04M 15/857; H04M 2215/0188; H04M 15/80; H04M 15/30; H04M 15/46; H04M 15/59; H04M 15/81; H04M 2215/96; H04W 4/24; H04W 8/20; H04L 43/04
USPC .......................................................... 455/407
See application file for complete search history.

(56) References Cited

U.S. PATENT DOCUMENTS 6,308,328 B1 10/2001 Bowcutt et al.
7,184,749 B2 2/2007 Marsh et al.
(Continued)

FOREIGN PATENT DOCUMENTS

WO 2008/097105 A1 8/2008
WO 2008/155444 A1 12/2008
(Continued)

OTHER PUBLICATIONS

"Rapid Mobile Data Service Creation and Monetization", Retrieved at <<http://www.amdocs.conn/Products/network-control/Documents/data-experience-solution-datasheet.pdf>>, 2012, pp. 1-7.
(Continued)

*Primary Examiner* — Timothy Pham
(74) *Attorney, Agent, or Firm* — Brian Haslam; Mike Allen; Micky Minhas

(57) ABSTRACT

Embodiments automatically adjust one or more terms of a data usage plan of a user to reduce network transfer costs for the user. Data usage statistics representing network data consumption by at least one computing device of the user are received or collected. The data usage plan is compared with the data usage statistics (e.g., to estimate any excess network transfer costs), and the data usage plan is adjusted accordingly and based on other data usage plans or adjustments that are available.

20 Claims, 8 Drawing Sheets

(51) Int. Cl.

| | | |
|---|---|---|
| *H04W 24/02* | (2009.01) | |
| *H04M 15/00* | (2006.01) | |
| *H04L 12/14* | (2006.01) | |
| H04M 3/00 | (2006.01) | |
| H04L 12/26 | (2006.01) | |
| H04W 24/00 | (2009.01) | |
| H04W 8/18 | (2009.01) | |
| H04M 1/725 | (2006.01) | |

(52) U.S. Cl.
CPC ............... *H04W 8/18* (2013.01); *H04M 15/58* (2013.01); *H04L 43/0876* (2013.01); *H04L 12/1435* (2013.01); *H04M 15/83* (2013.01); *H04M 15/84* (2013.01); *H04M 15/846* (2013.01); *H04M 15/85* (2013.01); *H04M 15/86* (2013.01); *H04M 1/72522* (2013.01); *H04M 15/775* (2013.01); *H04M 15/8044* (2013.01); *H04M 15/854* (2013.01); *H04M 15/856* (2013.01)

(56) References Cited

U.S. PATENT DOCUMENTS

| | | | |
|---|---|---|---|
| 7,277,938 | B2 | 10/2007 | Duimovich et al. |
| 7,320,131 | B1 | 1/2008 | O'Toole, Jr. |
| 7,406,596 | B2 | 7/2008 | Tararukhina et al. |
| 7,418,532 | B2 | 8/2008 | Suzuki et al. |
| 7,720,727 | B2 | 5/2010 | Keyes et al. |
| 7,904,080 | B2 | 3/2011 | Atkins et al. |
| 7,986,935 | B1 | 7/2011 | D'Souza et al. |
| 8,064,876 | B2 | 11/2011 | Knight |
| 8,359,389 | B1 | 1/2013 | Cohen et al. |
| 8,484,568 | B2 | 7/2013 | Rados et al. |
| 2002/0029273 | A1 | 3/2002 | Haroldson et al. |
| 2002/0082991 | A1 | 6/2002 | Friedman et al. |
| 2003/0066055 | A1 | 4/2003 | Spivey |
| 2003/0115385 | A1 | 6/2003 | Adamane et al. |
| 2004/0111712 | A1 | 6/2004 | Humpert et al. |
| 2004/0153587 | A1 | 8/2004 | Choi |
| 2004/0176965 | A1 | 9/2004 | Winch et al. |
| 2004/0199634 | A1 | 10/2004 | Jackowski et al. |
| 2006/0141983 | A1 | 6/2006 | Jagannathan et al. |
| 2006/0211404 | A1 | 9/2006 | Cromp et al. |
| 2007/0211674 | A1 | 9/2007 | Ragnar et al. |
| 2007/0294562 | A1 | 12/2007 | Takamatsu et al. |
| 2008/0318621 | A1 | 12/2008 | Fan et al. |
| 2009/0054030 | A1 | 2/2009 | Golds |
| 2009/0068980 | A1* | 3/2009 | Creswell et al. ............. 455/405 |
| 2009/0068984 | A1* | 3/2009 | Burnett ......................... 455/408 |
| 2009/0138427 | A1 | 5/2009 | Kalavade |
| 2009/0172275 | A1 | 7/2009 | Nochimowski et al. |
| 2009/0196302 | A1 | 8/2009 | Pastorino et al. |
| 2009/0199196 | A1 | 8/2009 | Peracha |
| 2009/0203352 | A1 | 8/2009 | Fordon et al. |
| 2009/0285201 | A1 | 11/2009 | Ben-Haim et al. |
| 2010/0015926 | A1 | 1/2010 | Luff |
| 2010/0017506 | A1 | 1/2010 | Fadell |
| 2010/0035576 | A1 | 2/2010 | Jones et al. |
| 2010/0130163 | A1 | 5/2010 | Pousti |
| 2010/0180190 | A1 | 7/2010 | Carroll |
| 2010/0191612 | A1 | 7/2010 | Raleigh |
| 2010/0318647 | A1 | 12/2010 | Savoor et al. |
| 2011/0019566 | A1* | 1/2011 | Leemet et al. ................ 370/252 |
| 2011/0087985 | A1 | 4/2011 | Buchanan et al. |
| 2011/0137776 | A1 | 6/2011 | Goad et al. |
| 2011/0145920 | A1 | 6/2011 | Mahaffey et al. |
| 2011/0151831 | A1 | 6/2011 | Pattabiraman et al. |
| 2011/0176482 | A1 | 7/2011 | Vizor et al. |
| 2011/0211465 | A1 | 9/2011 | Farrugia et al. |
| 2011/0231551 | A1 | 9/2011 | Hassan et al. |
| 2011/0238826 | A1 | 9/2011 | Carre et al. |
| 2011/0244826 | A1 | 10/2011 | Krishnan et al. |
| 2011/0275344 | A1 | 11/2011 | Momtahan et al. |
| 2011/0276442 | A1 | 11/2011 | Momtahan et al. |
| 2012/0054661 | A1 | 3/2012 | Rados et al. |
| 2012/0101952 | A1 | 4/2012 | Raleigh et al. |
| 2012/0142310 | A1 | 6/2012 | Pugh et al. |
| 2012/0155296 | A1* | 6/2012 | Kashanian ..................... 370/252 |
| 2012/0163232 | A1* | 6/2012 | Yoo .............................. 370/253 |
| 2012/0208495 | A1 | 8/2012 | Lawson et al. |
| 2012/0278194 | A1 | 11/2012 | Dewan et al. |
| 2012/0315872 | A1 | 12/2012 | Amato et al. |
| 2013/0023230 | A9* | 1/2013 | Momtahan et al. ........... 455/405 |
| 2013/0117846 | A1 | 5/2013 | Mahaffey et al. |
| 2013/0122882 | A1* | 5/2013 | Patel et al. .................... 455/418 |
| 2013/0149994 | A1 | 6/2013 | Gaddam et al. |

FOREIGN PATENT DOCUMENTS

| | | |
|---|---|---|
| WO | 2012/083285 A2 | 6/2012 |
| WO | 2012/162419 A1 | 11/2012 |

OTHER PUBLICATIONS

Blass, Evan, "Exclusive: Windows Phone 8 Detailed", Retrieved at <<http://pocketnow.com/windows-phone/exclusive-windows-phone-8-detailed>>, Feb. 2, 2012, pp. 2.

Sinofsky, Steven, "Engineering Windows 8 for mobile networks", Retrieved at <<http://blogs.msdn.com/b/b8/archive/2012/01/20/engineering-windows-8-for-mobility.aspx>>, Jan. 20, 2012, pp. 28.

"Non-Final Office Action Issued in U.S. Appl. No. 13/721,029", Mailed Date: Mar. 11, 2014, filed Dec. 20, 2012, 14 Pages.

"International Search Report & Written Opinion for PCT Patent Application No. PCT/US2013/022353", Mailed Date: May 15, 2013, Filed Date: Jan. 21, 2013, 10 Pages.

Heikkinen, et al., "Measuring Mobile Peer-to-Peer Usage: Case Finland 2007", In Proceedings of the 10th International Conference on Passive and Active Network Measurement, 2009, pp. 165-174.

"Non-Final Office Action Issued in U.S. Appl. No. 13/721,053", Mailed Date: Mar. 18, 2014, filed Dec. 20, 2012, 8 Pages.

"International Search Report & Written Opinion for PCT Patent Application No. PCT/US2013/022822", Mailed Date: Apr. 25, 2013, Filed Date: Jan. 24, 2013, 9 Pages.

Heinz II, Gerard J., "Priorities in Stream Transmission Control Protocol (SCTP) Multistreaming", A Thesis Submitted to the Faculty of the University of Delaware in Partial Fulfillment of the Requirements for the Degree of Master of Degree in Computer and Information Science, 2003, 35 Pages.

Peddemors, Arjan, "Network Resource Awareness and Prediction on Mobile Devices", Novay PhD. Research Series, No. 026 (Novay/PRS/026), Oct. 2009, 236 Pages.

Balasubramanian, Aruna, "Architecting Protocols to Enable Mobile Applications in Diverse Wireless Networks", A Dissertation Submitted to the Graduate School of the University of Massachusetts Amherst in Partial Fulfillment of the requirements for the Degree of Doctor of Philosophy, Feb. 2011, 198 Pages.

"Non-Final Office Action Issued in U.S. Appl. No. 13/721,041", Mailed Date: Mar. 28, 2014, filed Dec. 20, 2012, 15 Pages.

"Non-Final Office Action Issued in U.S. Appl. No. 13/721,069", Mailed Date: Mar. 14, 2014, filed Dec. 20, 2012, 15 Pages.

"Non-Final Office Action Issued in U.S. Appl. No. 13/721,023", Mailed Date: Mar. 28, 2014, filed Dec. 20, 2012, 16 Pages.

Unuth, Nadeem, "Data Usage Monitor Apps for Your iPhone and iPad", Retrieved Date: Oct. 8, 2012 Available at: http://voip.about.com/od/voipbandwidth/tp/Data-Usage-Monitor-Apps-For-Your-Iphone-And-Ipad.htm.

"Non-Final Office Action Issued in U.S. Appl. No. 13/721,058", Mailed Date: Apr. 16, 2014, filed Dec. 20, 2012, 11 Pages.

"Final Office Action Issued in U.S. Appl. No. 13/721,023", Mailed Date: Oct. 27, 2014, filed Dec. 20, 2012, 16 Pages.

"Final Office Action Issued in U.S. Appl. No. 13/721,058 ", Mailed Date: Sep. 22, 2014, filed Dec. 20, 2012, 15 Pages.

"Applicant Initialed Interview Summary in U.S. Appl. No. 13/721,053", Mailed Date: May 30, 2014, filed Dec. 20, 2012, 3 pages.

"Examiner Initialed Interview Summary in U.S. Appl. No. 13/721,053", Mailed Date: Aug. 19, 2014, filed Dec. 20, 2012, 2 pages.

(56) References Cited

OTHER PUBLICATIONS

Notice of Allowance Issued in U.S. Appl. No. 13/721,053, Mailed Date: Aug. 19, 2014, filed Dec. 20, 2012, 14 Pages.

Notice of Allowance Issued in U.S. Appl. No. 13/721,053, Mailed Date: Oct. 28, 2014, filed Dec. 20, 2012, 7 Pages.

"Final Office Action Issued in U.S. Appl. No. 13/721,029", Mailed Date: Oct. 1, 2014, filed Dec. 20, 2012, 19 Pages.

"Supplementary Search Report Issued in European Patent Application No. 13741434.8", Mailed Date: Sep. 30, 2014, 3 Pages.

"Supplementary Search Report Issued in European Patent Application No. 13741633.5", Mailed Date: Sep. 18, 2014, 3 Pages.

"Non-Final Office Action Issued in U.S. Appl. No. 13/721,041", Mailed Date: Jan. 7, 2015, 20 Pages.

"Final Office Action Issued in U.S. Appl. No. 13/721,069", Mailed Date: Nov. 28, 2014, 23 Pages.

* cited by examiner

DYNAMICALLY ADJUSTING A DATA USAGE PLAN BASED ON DATA USAGE STATISTICS

CROSS-REFERENCE TO RELATED APPLICATIONS

This application claims the benefit of pending U.S. Provisional Application No. 61/696,472, filed Sep. 4, 2012, pending U.S. Provisional Application No. 61/591,503, filed Jan. 27, 2012, and pending U.S. Provisional Application No. 61/591,509, filed Jan. 27, 2012. The entirety of these provisional applications is hereby incorporated by reference herein.

This application is related to the following applications: U.S. patent application entitled "Tracking Data Usage Under a Schematized Data Usage Plan," U.S. patent application entitled "Managing Data Transfers Over Network Connections Based on Priority and a Data Usage Plan," U.S. patent application entitled "On-Device Attribution of Network Data Usage," U.S. patent application entitled "Predicting Network Data Consumption Relative to Data Usage Patterns," U.S. patent application entitled "Updating Dynamic Data Usage Plans and Statistics," U.S. patent application entitled "Data Usage Profiles for Users and Applications," U.S. patent application entitled "Recommendations for Reducing Data Consumption Based on Data Usage Profiles," and U.S. patent application entitled "Managing Network Data Transfers in View of Multiple Data Usage Plans." All of these applications are incorporated by reference herein in their entirety.

BACKGROUND

With the increased popularity of smart telephones, tablets, and other mobile devices, there has been a similar increase in the amount of data handled by the networks of mobile operators. To reduce the strain on network infrastructure and to reduce network transfer costs, mobile operators are shifting from offering simple unlimited mobile data plans to offering capped and metered plans. Some of these capped and metered plans are complex, with allotted data caps varying based on network type, time of day, etc. Further, the fees for exceeding the allotted data caps may be significant and may also vary based on network type, time of day, etc. The existing systems generally lack mechanisms to help the user understand and manage network data consumption and transfer costs in view of the data usage plans.

As a result, with the existing systems, users can unknowingly exceed the allotted data caps and experience bandwidth throttling (e.g., a reduction or limit placed upon the rate of consumption) and/or be presented with a much larger than normal monthly bill, resulting in "bill shock." Throttling and bill shock can impact the user experience, leading to dissatisfied customers, increased customer service calls, and negative impressions of the mobile operators.

SUMMARY

Embodiments of the disclosure reduce costs associated with a data usage plan by automatically adjusting the data usage plan based on a comparison with data usage statistics. A computing device accesses data describing the data usage plan and receives the data usage statistics. The data usage statistics describe network data consumed by the computing device under the data usage plan. The computing device compares the accessed data with the received data usage statistics and automatically adjusts one or more terms of the data usage plan based on the comparison.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
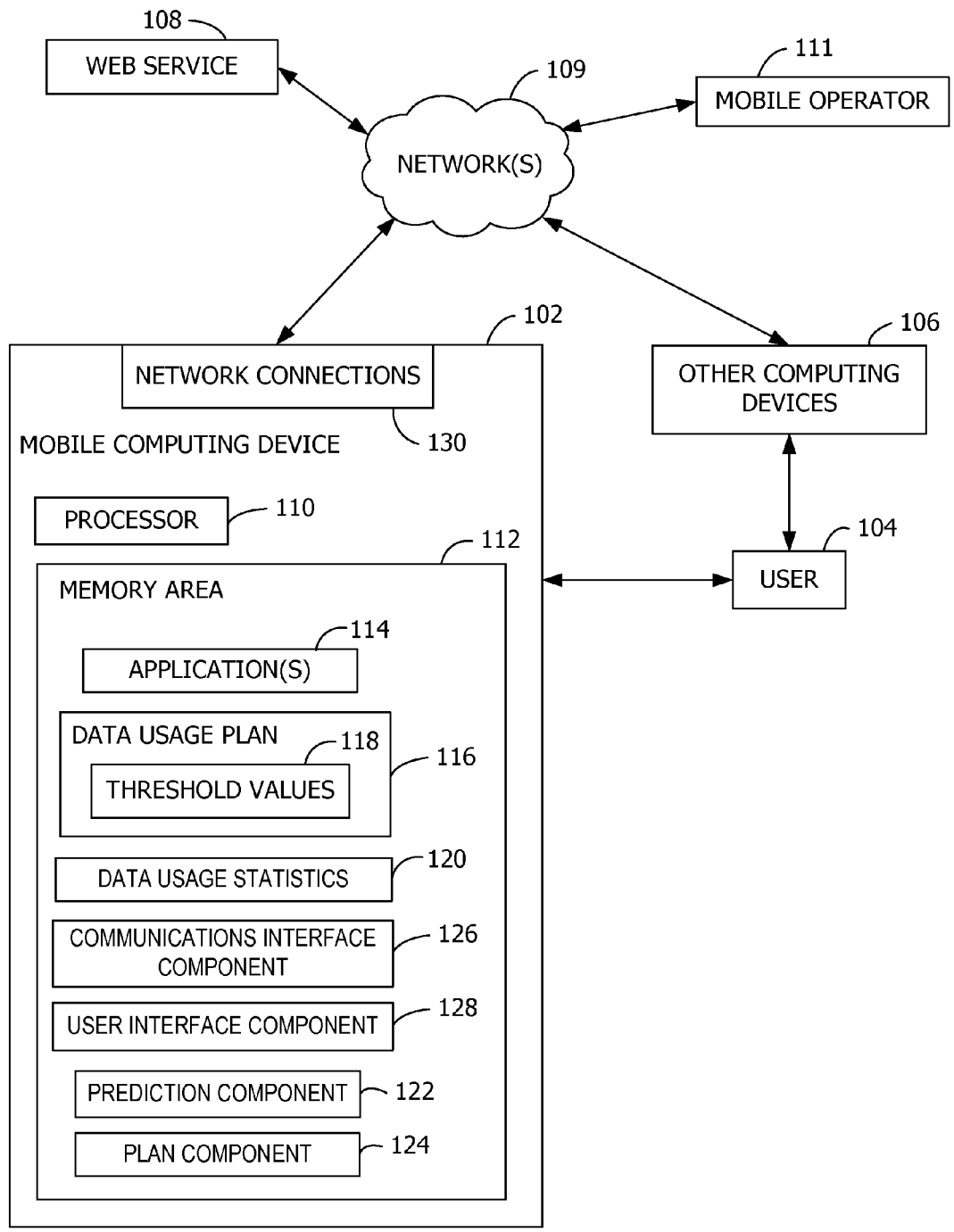
FIG. 1 is an exemplary block diagram illustrating a web service interacting with a mobile operator and user computing devices.

Referring to the figures, embodiments of the disclosure automatically adjust a data usage plan 116 of a user 104 to reduce costs for the user 104. The data usage plan 116 (e.g., a current data usage plan 116) is compared to data usage statistics 120 representing network data consumption by at least one computing device of the user 104. Aspects of the disclosure analyze the available data usage plans 116 or adjustments available for the current data usage plan 116. In some embodiments, the data usage plan 116 is upgraded or downgraded on the fly with minimal or no input from the user 104.

Referring to FIG. 1, an exemplary block diagram illustrates the web service 108 interacting with the mobile operator 111 and user computing devices. The user computing devices include, for example, a mobile computing device 102 and other computing devices 106. The user computing devices communicate over one or more networks 109. In some embodiments, one or more of the user computing devices are associated with one of the data usage plans 116. The data usage plan 116 represents the terms and/or conditions (e.g., network data consumption allotment) under which the mobile operator 111 provides data transfer services to the user computing devices. For example, a plurality of the user computing devices may share network data consumption allotted under the same or common data usage plan 116.

The user computing devices include any device executing instructions (e.g., as application programs, operating system functionality, or both) to implement operations and functionality. The user computing devices may include, for example, the mobile computing device 102 or any other portable device. In some embodiments, the mobile computing device 102 includes a mobile telephone (e.g., mobile telephone 304 in FIG. 3), laptop, tablet, computing pad, netbook, gaming device, e-reader, and/or portable media player. The other computing devices 106 may include less portable devices such as desktop personal computers, kiosks, and tabletop devices that have network connectivity capabilities. Additionally, each user computing device may represent a group of processing units. While aspects of the disclosure may be described herein with reference to the mobile computing device 102, the descriptions are applicable to any of the user computing devices.

Communication to/from the user computing devices may occur using any protocol or mechanism over one or more of the networks 109. The networks 109 represent any infrastructure or other means for sending and/or receiving data. The networks 109 may include wired and/or wireless networks.

One or more of the mobile operators 111 communicate with the web service 108 and/or the user computing devices via the network 109. Further, the user computing devices communicate with the web service 108, or other entity that performs the operations described herein as being associated with the web service 108.

In some embodiments, the mobile computing device 102 and the other computing devices 106 are associated with a common data usage plan 116 of the user 104. For example, the mobile computing device 102 may represent the mobile telephone 304 of the user 104, while the other computing devices 106 may include a tablet and a laptop associated with the user 104. In other embodiments, the mobile computing device 102 and each of the other computing devices 106 are associated with separate data usage plans 116.

In some embodiments, the centralized web service 108 interacts with the user computing devices and the mobile operators 111 to distribute the data usage plans 116 and to aggregate the data usage statistics 120. For example, the web service 108 receives a schema populated with data relating to the data usage plan 116 from the mobile operator 111 and distributes the populated schema to one or more of the user computing devices associated with the data usage plan 116.

The web service 108 may further generate, monitor, collect, and/or receive the data usage statistics 120 from the mobile operators 111 and from one or more of the user computing devices. The data usage statistics 120 represent an amount of network data consumed by the user computing devices under the data usage plan 116. In some embodiments, the web service 108 reconciles any differences in the data usage statistics 120 received from different sources (e.g., the mobile operators 111 versus the mobile computing device 102).

In some embodiments, the mobile computing device 102 has at least one processor 110, a memory area 112, and at least one user interface (not shown). The processor 110 includes any quantity of processing units, and is programmed to execute computer-executable instructions for implementing aspects of the disclosure. The instructions may be performed by the processor 110 or by multiple processors executing within the mobile computing device 102, or performed by a processor external to the mobile computing device 102. In some embodiments, the processor 110 is programmed to execute instructions such as those illustrated in the figures.

In some embodiments, the processor 110 represents an implementation of analog techniques to perform the operations described herein. For example, the operations may be performed by an analog computing device and/or a digital computing device.

The mobile computing device 102 further has one or more computer readable media such as the memory area 112. The memory area 112 includes any quantity of media associated with or accessible by the mobile computing device 102. The memory area 112 may be internal to the mobile computing device 102 (as shown in FIG. 1), external to the mobile computing device 102 (not shown), or both (not shown). In some embodiments, the memory area 112 includes read-only memory and/or memory wired into an analog computing device.

The memory area 112 stores, among other data, one or more applications 114. The applications 114, when executed by the processor 110, operate to perform functionality on the mobile computing device 102. Exemplary applications 114 include mail application programs, web browsers, calendar application programs, address book application programs, messaging programs, media applications, location-based services, search programs, and the like. The applications 114 may communicate with counterpart applications or services such as the web services 108 accessible via the network 109. For example, the applications 114 may represent downloaded client-side applications that correspond to server-side services executing in a cloud.

The mobile computing device 102 further establishes and maintains one or more network connections 130 representing communication channels or other means for sending and/or receiving data over the network 109. Exemplary network connections 130 include, but are not limited to, Wi-Fi, cellular, tethered, BLUETOOTH brand communication, near-field communication (NFC), and more. The network connections 130 may also be categorized into voice, text, data, or other categories or types of network traffic.

The memory area 112 further stores data describing at least one data usage plan 116 associated with the user 104. In some embodiments, the memory area 112 stores a plurality of data usage plans 116. The data describing the data usage plans 116 may be received from the mobile operators 111 offering the data usage plans 116.

The data usage plan 116 may be represented by a schema (e.g., an extensible markup language schema) or other data structure. For example, the user 104 has contracted with the mobile operator 111 to receive network data transfer services from the mobile operator 111. The data usage plan 116 describes the services provided by the mobile operator 111, such as the amount of network data the user 104 can consume during a particular duration (e.g., a billing time period). For example, the data usage plan 116 describes threshold values 118 associated with the network connections 130 of one or more devices of the user 104. The threshold values 118 represent a maximum amount of network data consumption allotted under the data usage plan 116 for the network connections 130. For example, one threshold value 118 may indicate a maximum amount of network data consumption for a Wi-Fi connection, while another threshold value 118 indicates a maximum amount of network data consumption for a cellular data connection.

The schema or other data structure representing the data usage plan 116 may be defined by the web service 108, by the mobile operator 111, or by another entity. In some embodiments, each of the various data usage plans 116 subscribed to by the mobile computing device 102 and the other computing devices 106 use the same common schema. In general, the schema enables descriptions of the parts, components, services, features, or other aspects of the data usage plan 116 including, but not limited to, multi-rate data plans, peak times, roaming rates, allotted network data consumption per network connection 130, etc. In some embodiments, use of the schema allows the mobile operators 111 to send out updated portions of the schema corresponding to updated parts of a particular data usage plan 116.

In some embodiments, the schema includes a plurality of fields. Each of the threshold values 118 may be associated with one or more of the fields. For example, the fields may correspond to one or more of the following: peak times, off-peak times, peak time network data consumption quota, off-peak time network data consumption quota, peak time network data consumption remaining, off-peak time network data consumption remaining, a roaming rate, rules, a mobile operator name, a billing cycle type, a network connection type, identification of free hosts available for connection, a list of mobile hotspots, and any other elements or information pertaining to the data usage plan 116. The list of free hosts represents zero-rated or reduced cost hosts (e.g., visiting particular web sites does not count against the data usage plan 116).

The schema may also include fields supporting different billing rates per host accessed, per weekend, per night, friends and family rates, peak and off-peak rates, and more. The schema also allows each mobile operator 111 the flexibility to define complex plans including broadly offered plans, and dynamic, short-term offers to specific users 104 likely to use a specific part or parts of the overall services. Other offers based on any combination of the metrics obtained are available to the mobile operator 111.

The schema stored by the mobile computing device 102 may also include fields corresponding to the data usage statistics 120 collected, generated, or received by the mobile computing device 102 and/or the mobile operators 111. For example, to facilitate sharing the data usage statistics 120 among the mobile operators 111, web service 108, and/or user computing devices, the mobile operators 111, web service 108, and the user computing devices may populate the schema with the data usage statistics 120.

While the schema may take any form or structure, the schema may be implemented as XML schema. Appendix A includes an exemplary XML schema for use in aspects of the disclosure.

The memory area 112 further stores the data usage statistics 120 relating to one or more of the data usage plans 116. The data usage statistics 120 may be viewed as a current or instant snapshot of the amount of data transmitted and/or received (e.g., an amount of data consumed) by the mobile computing device 102. For example, the mobile computing device 102 collects ongoing usage data relating to network data transfers, such as from device radios, drivers, and accelerometers of the mobile computing device 102. The data usage statistics 120 identify, to a granularity of time (e.g., per minute) or data (e.g., per kilobyte), how much data has been sent and/or received by the mobile computing device 102, the time and date of usage, the location of usage, network interface used (e.g., over which network connections 130), the subscriber identity module (SIM) card or other user identity module used for dual SIM scenarios, the international mobile station equipment identity (IMEI) or other device identifier for multi-device scenarios, the Internet protocol (IP) address or other address of the access point used for Wi-Fi scenarios, the IP address or other address of the target computer (e.g., for whitelist/blacklists in data usage), the application responsible for the data transfer, and the like. In a further example, information relating to text messages, data, voice calls, minutes used, voice over Internet Protocol (VoIP) usage, and any other element of usage consumed by, or that impacts, the mobile computing device 102 is collected to produce the data usage statistics 120. Other data usage statistics 120 are also contemplated.

The data usage statistics 120 may be collected by the mobile computing device 102, the web service 108, and/or the mobile operators 111. For example, the data usage statistics 120 may be compiled directly (e.g., by monitoring network traffic) and/or by collecting the data usage statistics 120 from other devices that perform the collection.

Alternatively or in addition, the mobile computing device 102 receives updates of network data consumption by the other computing devices 106 sharing the same data usage plan 116. For example, the data usage statistics 120 may represent the network data collectively consumed by the mobile telephone 304, tablet, and laptop of the user 104.

In a further example, the mobile operator 111 collects data usage statistics 120 corresponding to a plurality of data usage plans 116. In such an example, there may be a plurality of sets of data usage statistics 120 (e.g., one set for each data usage plan 116 or user 104).

In some embodiments, the mobile operator 111 may have more current and/or more accurate data usage statistics 120 for one or more of the user computing devices than the user computing devices. For example, the mobile operator 111 may have more current and/or more accurate data usage statistics 120 for particular network connections 130 than the user computing devices. The mobile operator 111 may push, or transmit upon demand, such data usage statistics 120 to the web service 108 and/or to the mobile computing device 102. The web service 108 and/or the mobile computing device 102 integrates or otherwise reconciles the data from the mobile operator 111 and/or the user computing devices to produce the data usage statistics 120, which are then sent to the mobile computing device 102 for storage.

The memory area 112 further stores exemplary computer-executable components such as a communications interface component 126, a user interface component 128, a prediction component 122, and a plan component 124. Operation of the computer-executable components, when executed, is described below with reference to FIG. 2.

Figure 2:
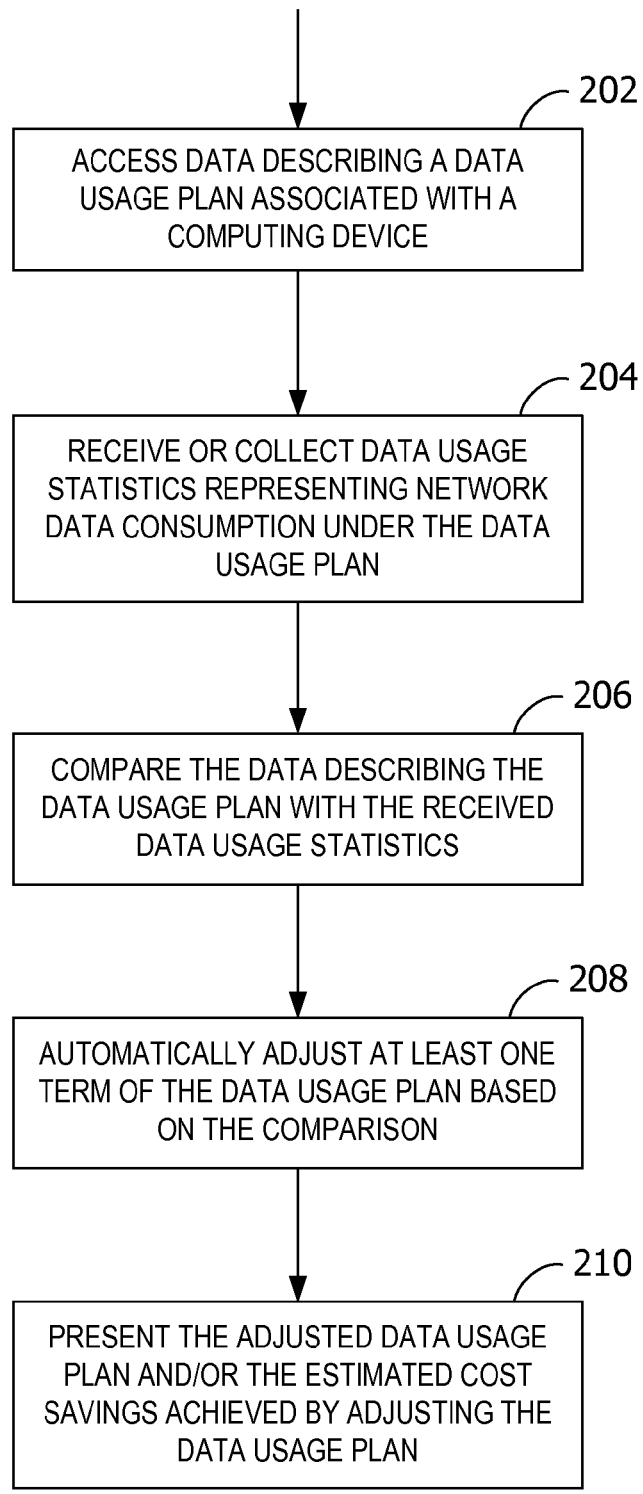
FIG. 2 is an exemplary flow chart illustrating operation of a computing device and/or a web service to automatically adjust a data usage plan based on a comparison between the data usage plan and data usage statistics.

Referring next to FIG. 2, an exemplary flow chart illustrates operation of the computing device and/or the web service 108 to automatically adjust at least one of the data usage plans 116 based on a comparison between the data usage plan 116 and the data usage statistics 120. While the operations illustrated in FIG. 2 are described in some embodiments as being performed by the mobile computing device 102 in some embodiments, the operations may be performed by the web service 108, or a proxy device in communication with the web service 108. In general, one or more of the operations may be performed by any computing device local to, or remote from, the user 104. Further, the operations may be performed at an operating system level or an application program level.

At 202, the mobile computing device 102 accesses data describing the data usage plan 116 (e.g., a current data usage plan 116) associated with at least the mobile computing device 102. For example, the mobile computing device 102 receives a schema populated with data describing the data usage plan 116. The populated schema may be received from, for example, the mobile operator 111, the web service 108, and/or the other computing devices 106.

At 204, the mobile computing device 102 receives or collects the data usage statistics 120 describing network data consumed by the mobile computing device 102 under the data usage plan 116. The data usage statistics 120 may be received from, for example, the mobile operator 111, the web service 108, and/or the other computing devices 106. In some embodiments, at least a portion of the data usage statistics 120 is received from the other computing devices 106 that share the same data usage plan 116.

At 206, the mobile computing device 102 compares the accessed data describing the data usage plan 116 with the received data usage statistics 120. At 208, the mobile computing device 102 automatically adjusts one or more terms of the data usage plan 116 based on the comparison. For example, the mobile computing device 102 adjusts the terms without input from the user 104, such as without authorization from the user 104 at the time of adjustment. Exemplary terms include, but are not limited to, any of the threshold values 118 associated with the data usage plan 116. For example, the mobile computing device 102 may automatically adjust the threshold values 118 to increase or decrease the maximum amount of network data consumption allotted under the data usage plan 116. In some embodiments, the mobile computing device 102 adjusts the terms by exchanging or switching the current data usage plan 116 for another data usage plan 116.

At 210, the mobile computing device 102 may present the adjusted data usage plan 116 to the user 104 (e.g., highlighting and/or identifying the terms that have changed). The mobile computing device 102 may also display the estimated cost savings anticipated from the adjustment to the data usage plan 116.

In some embodiments, the mobile computing device 102 may store, or have access to, the computer-executable components illustrated in FIG. 1 that implement one or more of the operations illustrated in FIG. 2. For example, the communications interface component 126, when executed by the mobile computing device 102, receives data describing the data usage plan 116 associated with at least the mobile computing device 102. The communications interface component 126 further receives the data usage statistics 120 describing network data consumed by the mobile computing device 102 under the data usage plan 116. In some embodiments, the communications interface component 126 includes a network interface card and/or computer-executable instructions (e.g., a driver) for operating the network interface card. In some embodiments, the communications interface is operable with near-field communication (NFC) tags.

The plan component 124, when executed by the mobile computing device 102, automatically adjusts one or more terms of the data usage plan 116 based on the comparison performed by the prediction component 122. In some embodiments, the plan component 124 further estimates anticipated excess data consumption charges based on the comparison performed by the prediction component 122. Estimating the anticipated excess data consumption charges includes, for example, determining whether (and how much) the user 104 and/or computing device 102 is under track, on track, or off track for network data usage based on the data usage statistics 120 compared to the threshold values 118 of the data usage plan 116. For example, given the day of the billing cycle and the current or up-to-date data consumption for the billing period, an extrapolation or projection is performed to predict the consumption associated with the end of the billing cycle. In some embodiments, the data usage plan 116 identifies charges (e.g., per kilobyte) for exceeding the threshold values 118.

The user interface component 128, when executed by the mobile computing device 102, presents the data usage plan 116 adjusted by the plan component 124 to the user 104 of the mobile computing device 102. In some embodiments, the user interface component 128 includes a graphics card for displaying data to the user 104 and for receiving data from the user 104. The user interface component 128 may also include computer-executable instructions (e.g., a driver) for operating the graphics card. Further, the user interface component 128 may include a display (e.g., a touch screen display or natural user interface) and/or computer-executable instructions (e.g., a driver) for operating the display. The user interface component 128 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the mobile computing device 102 in a particular way.

In some embodiments, the prediction component 122 further compares the received data usage statistics 120 with at least one other data usage plan 116. In such embodiments, the plan component 124 further estimates the anticipated cost savings associated with changing from the current data usage plan 116 to the other data usage plan 116. The user interface component 128 may also display to the user 104 the cost savings anticipated by the plan component 124.

Alternatively or in addition, the computer-executable components may be stored and executed by the web service 108.

The communications interface component 126 may execute independently of the other computer-executable components (e.g., not sequentially, or without interaction or dependency between the two components). For example, the communications interface component 126 may be executed by a thread separate from other thread(s) executing the other computer-executable components.

Figure 3:
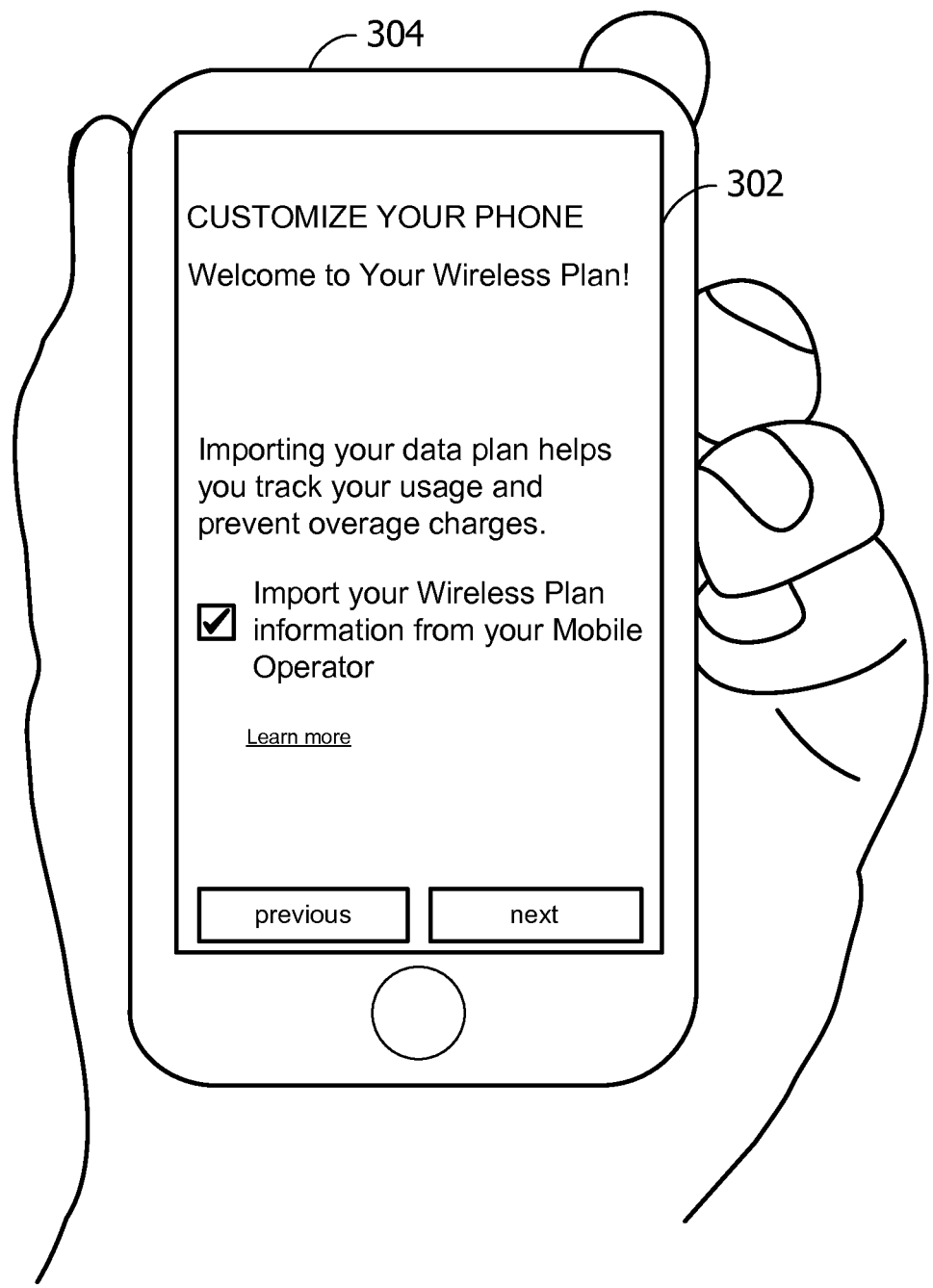
FIG. 3 is an exemplary user interface illustrating configuration options for importing data describing a data usage plan.

Referring next to FIG. 3, an exemplary user interface 302 on the mobile telephone 304 illustrates configuration options for importing data describing the data usage plan 116. Importing the data describing the data usage plan 116 enables the mobile computing device 102 to perform operations, such as those illustrated in FIG. 2, to automatically minimize or otherwise reduce data transfer costs.

In the example of FIG. 3, the user 104 is able to explicitly opt-in or opt-out of receiving the data describing at least one of the data usage plans 116 of the user 104 (e.g., a schema populated with the data usage plan 116). For example, the mobile telephone 304 asks permission from the user 104 to retrieve the wireless plan details to help avoid overcharges. The user 104 checks a checkbox to import the populated schema. In response, the mobile telephone 304 requests the data (e.g., the populated schema) from the mobile operator 111 or other entity and, upon receipt of the data, the mobile telephone 304 stores the data in the memory area 112 as the data usage plan 116.

Figure 4:
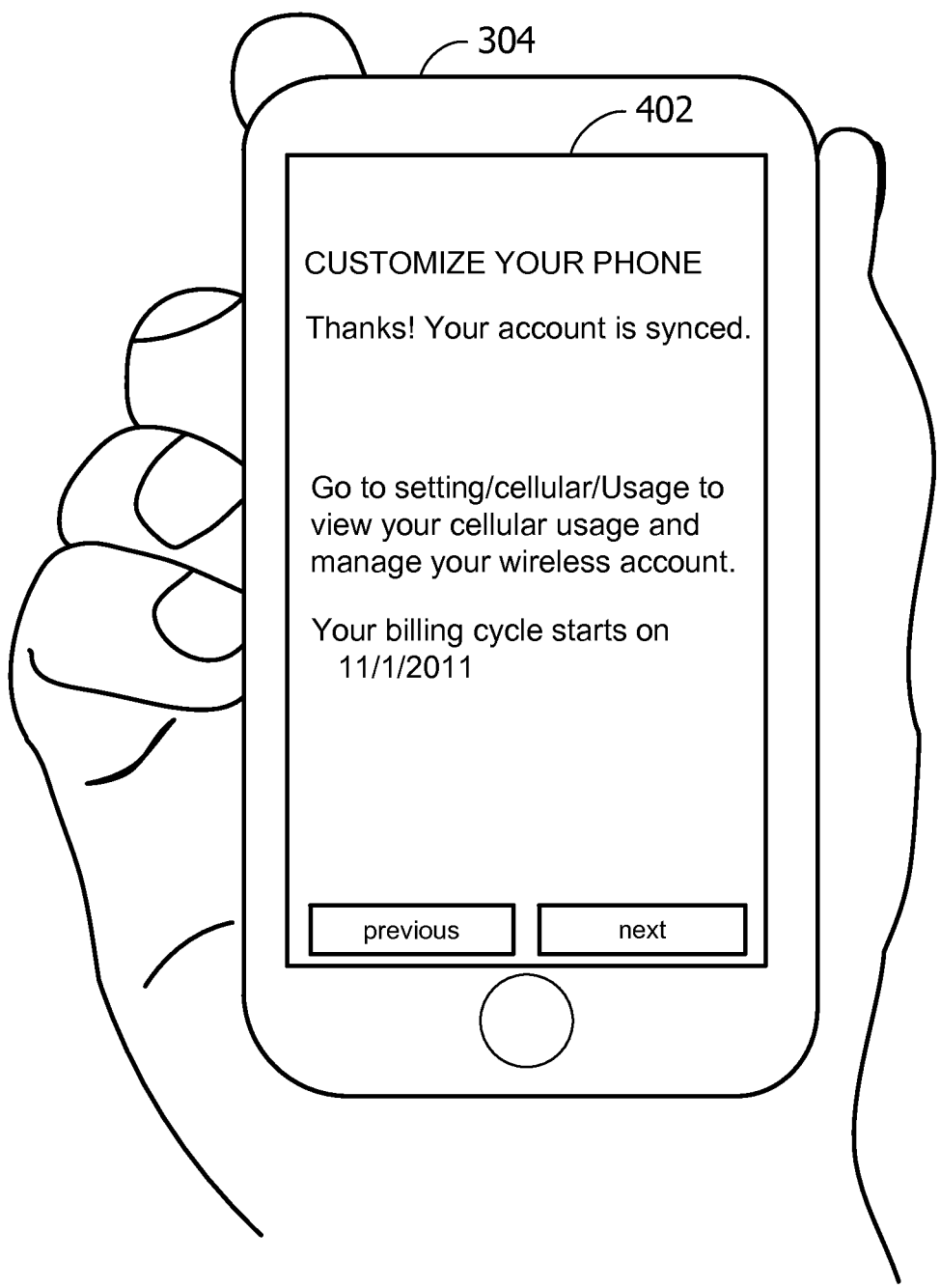
FIG. 4 is an exemplary user interface illustrating synchronization of data describing a data usage plan.

Referring next to FIG. 4, an exemplary user interface 402 illustrates completion of synchronization of data describing the data usage plan 116. In the example of FIG. 4, the user 104 has opted-in to obtaining, from the mobile operator 111, the data describing the data usage plan 116 (e.g., a schema populated with the terms of the data usage plan 116) that the user 104 and mobile operator 111 have agreed upon. The user 104 receives confirmation that the details of the data usage plan 116 have been downloaded, as displayed in the user interface 402 of the mobile telephone 304. The imported data includes details of the data usage plan 116, such as the start date of the billing cycle. The user interface 402 in FIG. 4 further displays the start date of the billing cycle to the user 104. The user interface 402 also displays a message telling the user 104 how to check current usage and modify account settings.

Figure 5:
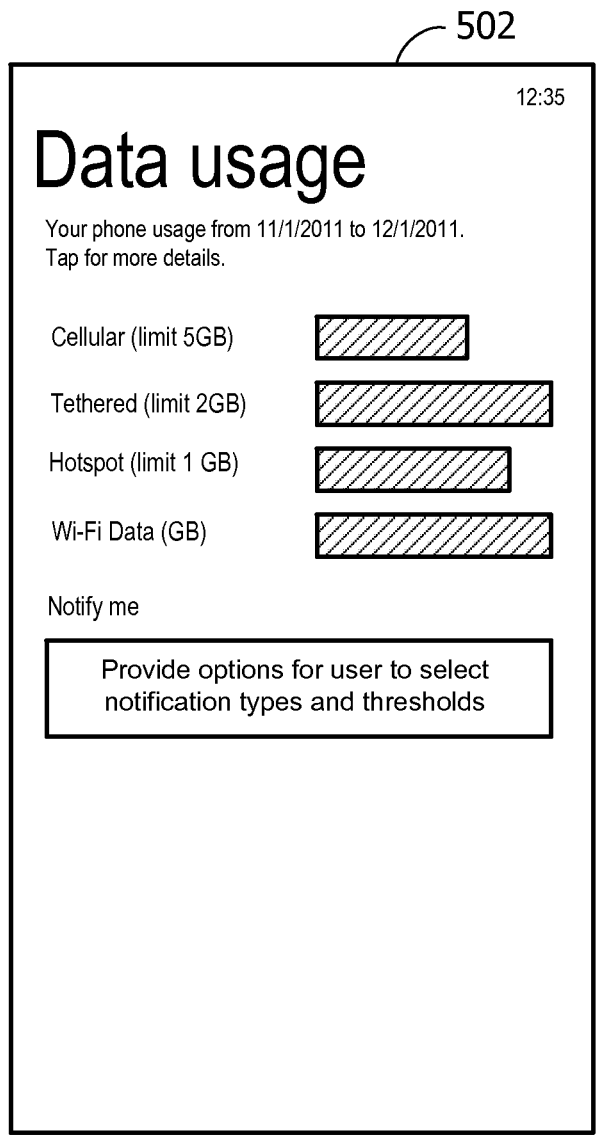
FIG. 5 is an exemplary user interface illustrating a summary of network data usage with different types of network connections.

Referring next to FIG. 5, an exemplary user interface 502 illustrates a summary of network data usage with different types of network connections 130. While the proportions of the user interfaces 502, 602, 604, 606 illustrated in FIG. 5, FIG. 6A, FIG. 6B, FIG. 6C, and FIG. 7 are shown to conform to a screen of the mobile computing device 102 (e.g., the mobile telephone 304), the content displayed within the user interfaces 502, 602, 604, 606 may be shown in any format on any of the user computing devices.

In FIG. 5, data usage for a plurality of the network connections 130 is shown to the user 104 in the user interface 502. In particular, data usage statistics 120 attributed to each of the exemplary network connections 130 is shown. For example, the amounts of data transmitted and/or received over a cellular network connection, a tethered network connection, a Hotspot network connection, and a Wi-Fi network connection are shown. The amounts of data are represented by horizontal bars sized proportionally to the corresponding amounts of data transmitted and/or received.

The user interface 502 also displays the threshold values 118 associated with each of the network connections 130. The threshold values 118 are taken from the data usage plan 116. For example, the data usage plan 116 indicates that the user 104 has a maximum of 5 gigabytes (GB) of data usage available for the cellular network connection, 2 GB of data usage for the tethered network connection, 1 GB of data usage for the Hotspot network connection, and an unlimited amount of data usage for the Wi-Fi network connection.

The user interface 502 in FIG. 5 may also display a button or bar that, when selected by the user 104 (e.g., clicked or touched), the user interface 502 allows the user 104 to select options or other configuration settings for receiving notifications. The notifications are sent when the amounts of data transmitted and/or received over the various network connections 130 reaches particular values (e.g., set by the user 104, mobile computing device 102, mobile operator 111, or other entity).

Figure 6:
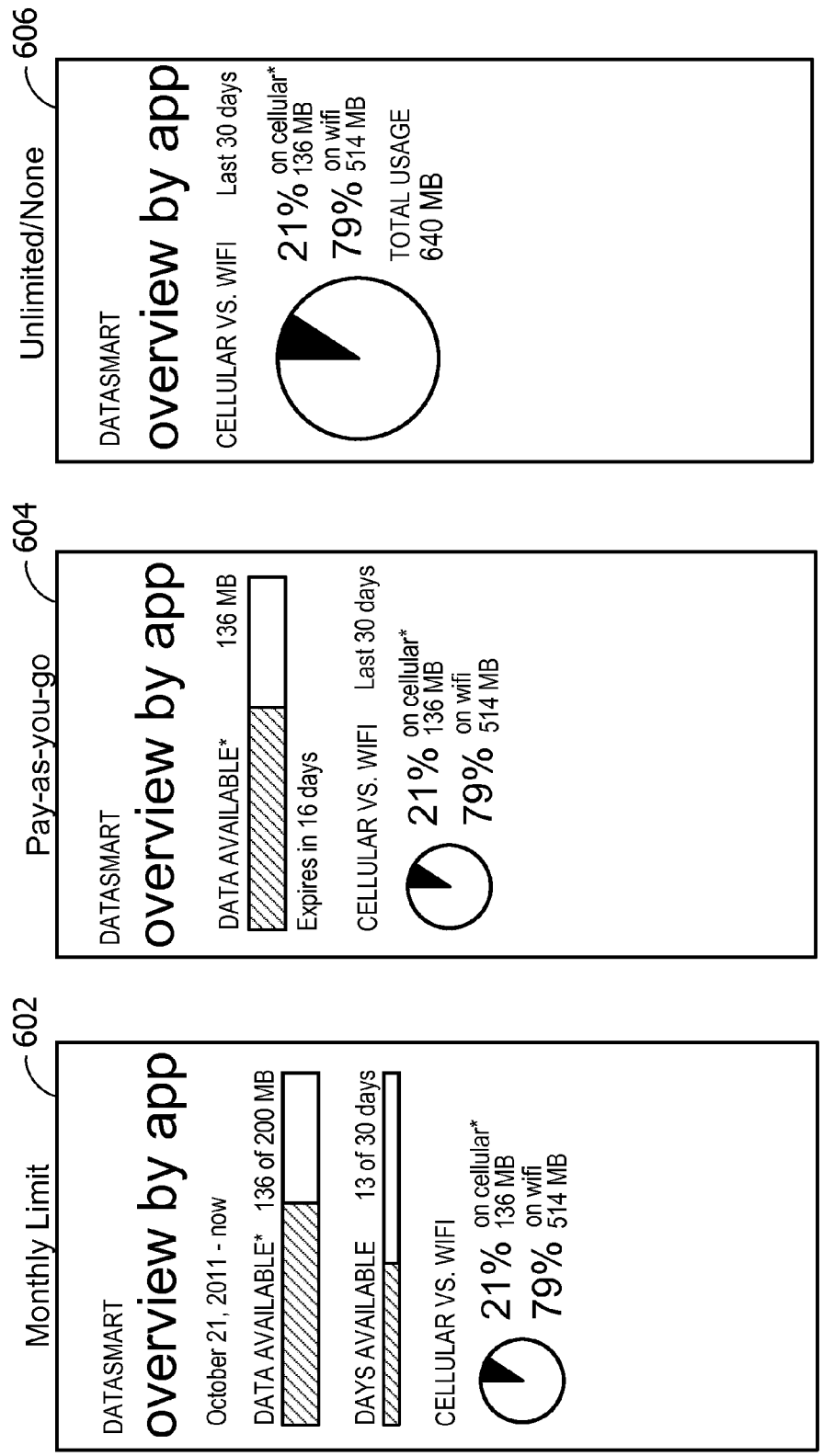
FIG. 6A is an exemplary user interface illustrating data usage by a mobile computing device consuming network data under a data usage plan with a monthly limit.
FIG. 6B is an exemplary user interface illustrating data usage by a mobile computing device consuming network data under a pay-as-you-go data usage plan.
FIG. 6C is an exemplary user interface illustrating data usage by a mobile computing device consuming network data under a data usage plan with unlimited data usage.

Referring next to FIG. 6A, an exemplary user interface 602 illustrates data usage by the mobile computing device 102 consuming network data under the data usage plan 116 having a monthly limit. While the overviews of data usage illustrated in FIG. 6A, FIG. 6B, and FIG. 6C indicate that the data usage statistics 120 shown are per application 114, the user interfaces 602, 604, 606 may alternatively or in addition display an overview of aggregated data usage across the applications 114 on the mobile computing device 102. Further, the user interfaces 602, 604, 606 may alternatively or in addition display an overview of data usage per computing device of the user 104 or aggregated across a plurality of the computing devices of the user 104. For example, the different statistics may be shown in different tabs or tiles in the user interfaces 602, 604, 606. In an example involving a family or shared data plan, the statistics for each plan member may be shown in separate tiles.

In FIG. 6A, the data usage statistics 120 include the amount of network data remaining for use (e.g., the remainder of the monthly limit specified by the data usage plan 116), the amount of network data used during the current billing period, and the quantity of time (e.g., days) remaining within the current billing period. The data usage statistics 120 also indicate a breakout of the data usage, such as the amount of data consumed under a cellular network connection versus the amount of data consumed under a Wi-Fi network connection.

Referring next to FIG. 6B, an exemplary user interface 604 illustrates data usage by the mobile computing device 102 consuming network data under a pay-as-you-go data usage plan 116. In FIG. 6B, the data usage statistics 120 include the amount of network data consumption remaining for use (e.g., the remainder of the pay-as-you-go amount specified by the data usage plan 116), the amount of network data consumed recently (e.g., within the last 30 days), and the quantity of time (e.g., days) remaining. For example, the remaining cellular network data consumption expires in 16 days. The data usage statistics 120 also indicate a breakout of the data usage, such as the amount of data consumed under a cellular network connection versus the amount of data consumed under a Wi-Fi network connection.

Referring next to FIG. 6C, an exemplary user interface 606 illustrates data usage by the mobile computing device 102 consuming network data under the data usage plan 116 with unlimited data usage. In FIG. 6C, the data usage statistics 120 include the amount of network data consumed recently (e.g., within the last 30 days). The data usage statistics 120 also indicate a breakout of the data usage, such as the amount of data consumed under a cellular network connection versus the amount of data consumed under a Wi-Fi network connection. The data usage statistics 120 also indicate a total amount of usage by the mobile computing device 102.

Figure 7:
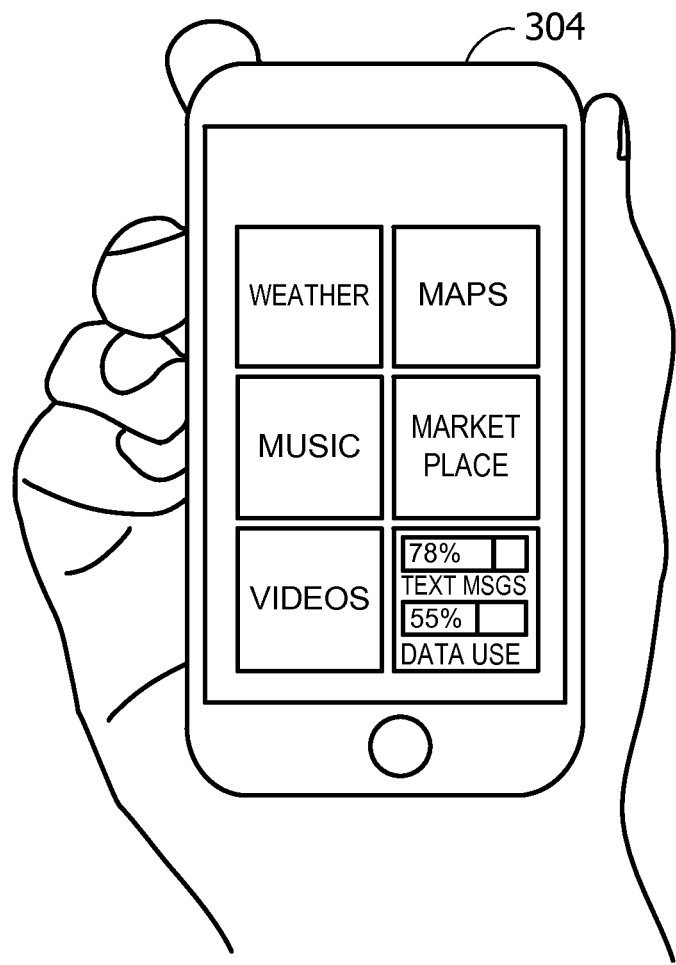
FIG. 7 is an exemplary block diagram illustrates a mobile computing device having a tile for displaying network data usage statistics to a user.

Referring next to FIG. 7, an exemplary block diagram illustrates the mobile computing device 102 as the mobile telephone 304 having a tile for displaying the data usage statistics 120 to the user 104. The mobile telephone 304 displays a plurality of tiles (e.g., active tiles) that may be updated with the data usage statistics 120. In some embodiments, tiles represent tile user interface elements. In the example of FIG. 7, the mobile telephone 304 indicates that 78% of the allotment for text messages has been consumed, while 55% of the allotment for data usage has been consumed.

Figure 8:
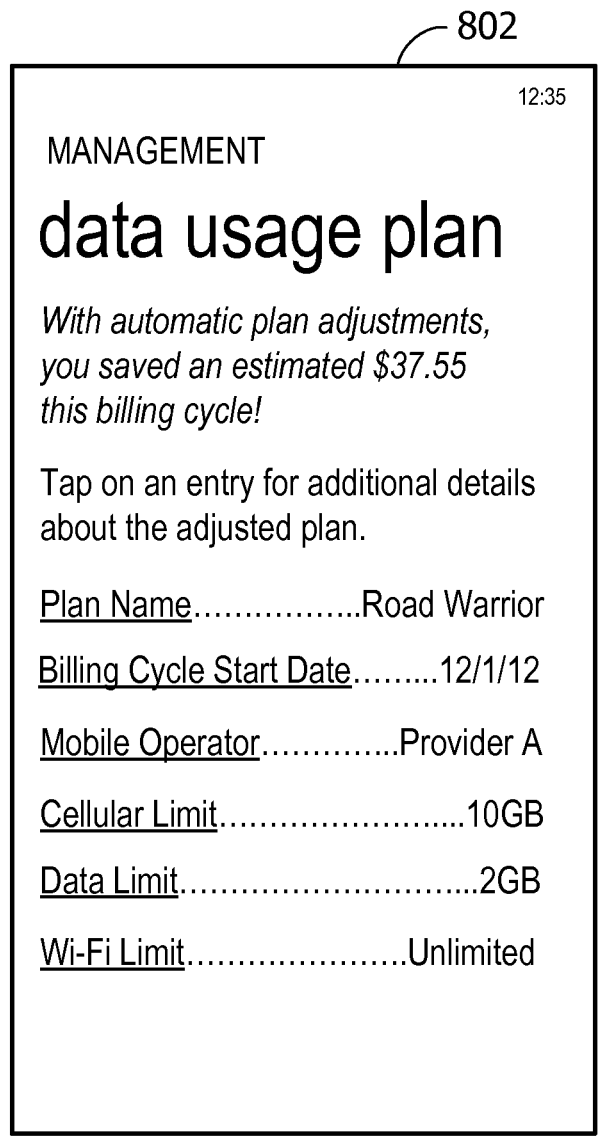
FIG. 8 is an exemplary user interface illustrating an adjusted data usage plan along with estimated cost savings based on the adjustments.

Referring next to FIG. 8, an exemplary user interface 802 illustrates the automatically-adjusted data usage plan 116 along with estimated cost savings based on the adjustments. The user interface 802 displays a plurality of the terms of the data usage plan 116, after the data usage plan 116 has been adjusted. In the example of FIG. 8, the user interface 802 displays the plan name, billing cycle start date, mobile operator, cellular limit, data limit, and Wi-Fi limit.

Other terms may be displayed in addition to, or as a replacement for, one or more of the terms displayed in the user interface 802. Further, the user interface displays the expected financial cost savings (e.g., in dollars) to be realized (e.g., per billing cycle) by adjusting the data usage plan 116.

The user interface 802 may further highlight or flag the terms automatically changed by the mobile computing device 102. For example, if the cellular limit has been adjusted, the user interface may bold, italicize, change the font, or change the color of the line of text displaying the new cellular limit.

Additional Examples

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "roaming" as used herein refers, in some embodiments, to connectivity provided outside a subscriber's home zone that may be subject to additional tariffs, fees, or constraints. Roaming service may or may not be provided by the same mobile operator 111. The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for minimizing costs associated with network data transfers by the mobile computing device 102 by adjusting the data usage plan 116 without input from the user 104, and exemplary means for upgrading or downgrading the data usage plan 116 without input from the user 104.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Listed below are exemplary schema portions that are operable in aspects of the disclosure. While written in extensible markup language (XML) format, the schema may be implemented in other formats.

```
<?xml version="1.0" encoding="UTF-8"?>
<xs:schema xmlns:xs="Base/v1"
elementFormDefault="qualified"
```

APPENDIX A-continued

Listed below are exemplary schema portions that are operable in aspects of the disclosure. While written in extensible markup language (XML) format, the schema may be implemented in other formats.

```xml
targetNamespace="CarrierControl/Base/v1">
    <!-- Basic types -->
    <xs:simpleType name="NameType">
        <xs:restriction base="xs:normalizedString">
            <xs:minLength value="1"/>
            <xs:maxLength value="255"/>
            <xs:whiteSpace value="collapse"/>
        </xs:restriction> </xs:simpleType>
    <xs:simpleType name="Priority">
        <xs:restriction base="xs:nonNegativeInteger">
            <xs:maxExclusive value="10"/>
        </xs:restriction>
    </xs:simpleType>
    <xs:simpleType name="GUID">
        <xs:annotation>
            <xs:documentation xml:lang="en"> The representation of a GUID,
generally the id of an element. </xs:documentation>
        </xs:annotation>
        <xs:restriction base="xs:token">
            <xs:pattern value="\{[a-fA-F0-9]{8}-[a-fA-F0-9]{4}-[a-fA-F0-9]{4}-[a-fA-F0-9]{4}-[a-fA-F0-9]{12}\}"/>
        </xs:restriction>
    </xs:simpleType>
    <xs:simpleType name="SubscriberType">
        <xs:restriction base="xs:token">
            <xs:maxLength value="20"/>
            <xs:pattern value="\w+"/>
        </xs:restriction>
    </xs:simpleType>
    <xs:complexType name="CertificateDetails">
        <xs:annotation>
            <xs:documentation> Used to identify a certificate or set of certificates.
SubjectName is compared against the DN provided as the certificate's Subject field, or
against any Name provided in the SubjectAlternativeName extentions of type
DirectoryName. IssuerName is compared against the DN provided as the certificate's
Issuer field, or against any Name provided in the IssuerAlternativeName extentions of
type DirectoryName. </xs:documentation>
        </xs:annotation>
        <xs:sequence>
            <xs:element name="SubjectName" type="xs:string"/>
            <xs:element name="IssuerName" type="xs:string"/>
        </xs:sequence>
    </xs:complexType>
    <!-- Alias definitions -->
    <xs:element name="AliasList">
        <xs:complexType>
            <xs:sequence>
                <xs:element maxOccurs="unbounded" ref="AliasDefinition"/>
            </xs:sequence>
        </xs:complexType>
    </xs:element>
    <xs:complexType name="AliasDefinitionBaseType">
        <xs:attribute name="Name" type="xs:string"/>
    </xs:complexType>
    <xs:element name="AliasDefinition" type="AliasDefinitionBaseType"
abstract="true"/>
    <!-- Locations -->
    <xs:simpleType name="ProviderNameType">
        <xs:restriction base="xs:normalizedString">
            <xs:minLength value="1"/>
            <xs:maxLength value="20"/>
            <xs:whiteSpace value="collapse"/>
        </xs:restriction>
    </xs:simpleType>
    <xs:simpleType name="ProviderIdType">
        <xs:restriction base="xs:token">
            <xs:pattern value="\d{1,6}"/>
        </xs:restriction>
    </xs:simpleType>
    <xs:complexType name="ProviderType">
        <xs:sequence>
            <xs:element name="ProviderID" type="ProviderIdType"/>
            <xs:element name="ProviderName" type="ProviderNameType"/>
        </xs:sequence>
    </xs:complexType>
    <xs:complexType name="LocationType">
```

APPENDIX A-continued

Listed below are exemplary schema portions that are operable in aspects of the disclosure. While written in extensible markup language (XML) format, the schema may be implemented in other formats.

```xml
        <xs:choice maxOccurs="unbounded">
            <xs:element name="Provider" type="ProviderType"/>
            <xs:element name="LocationAlias" type="xs:string"/>
        </xs:choice>
        <xs:attribute name="negate" type="xs:boolean" default="false"/>
    </xs:complexType>
    <xs:element name="LocationAliasDefinition"
type="LocationAliasDefinitionType" substitutionGroup="AliasDefinition"/>
    <xs:complexType name="LocationAliasDefinitionType">
        <xs:complexContent>
            <xs:extension base="AliasDefinitionBaseType">
                <xs:sequence>
                    <xs:element name="Location" type="LocationType"/>
                </xs:sequence>
            </xs:extension>
        </xs:complexContent>
    </xs:complexType>
    <!-- Times -->
    <xs:complexType name="TimeType">
        <xs:choice maxOccurs="unbounded">
            <xs:element name="TimePeriod" type="TimePeriod"/>
            <xs:element name="RecurringTimePeriod"
type="RecurringTimePeriod"/>
            <xs:element name="TimeAlias" type="xs:string"/>
        </xs:choice>
        <xs:attribute name="negate" type="xs:boolean" default="false"/>
    </xs:complexType>
    <xs:element name="TimeAliasDefinition" type="TimeAliasDefinitionType"
substitutionGroup="AliasDefinition"/>
    <xs:complexType name="TimeAliasDefinitionType">
        <xs:complexContent>
            <xs:extension base="AliasDefinitionBaseType">
                <xs:sequence>
                    <xs:element name="Time" type="TimeType"
maxOccurs="unbounded"/>
                </xs:sequence>
            </xs:extension>
        </xs:complexContent>
    </xs:complexType>
    <xs:simpleType name="TimeOfWeek">
        <xs:annotation>
            <xs:documentation> Defines a time as an offset from the midnight
preceding 12:00:01 AM Sunday (P0D) to the midnight following 11:59:59 PM
Saturday (P7D). </xs:documentation>
        </xs:annotation>
        <xs:restriction base="xs:duration">
            <xs:minInclusive value="P0D"/>
            <xs:maxInclusive value="P7D"/>
        </xs:restriction>
    </xs:simpleType>
    <xs:complexType name="RecurringTimePeriod">
        <xs:annotation>
            <xs:documentation> Defines a period of time within the week as a
start/end TimeOfWeek. If EndTime is less than StartTime, the period is interpreted as
crossing Saturday night. </xs:documentation>
        </xs:annotation>
        <xs:attribute name="StartTime" type="TimeOfWeek" use="required"/>
        <xs:attribute name="EndTime" type="TimeOfWeek" use="required"/>
    </xs:complexType>
    <xs:complexType name="TimePeriod">
        <xs:annotation>
            <xs:documentation> Defines a period of time as a start/end date and time.
</xs:documentation>
        </xs:annotation>
        <xs:attribute name="StartTime" type="xs:dateTime" use="required"/>
        <xs:attribute name="EndTime" type="xs:dateTime" use="required"/>
    </xs:complexType>
</xs:schema>
<?xml version="1.0" encoding="UTF-8"?>
<xs:schema xmlns:base="Base/v1"
elementFormDefault="qualified"
targetNamespace=" CarrierControl/Plans/v1">
    <xs:import schemaLocation="Alias.xsd"
        namespace="CarrierControl/Base/v1"/>
        <!-- Plan Definition -->
    <xs:complexType name="BillingCycleType">
```

APPENDIX A-continued

Listed below are exemplary schema portions that are operable in aspects of the disclosure. While written in extensible markup language (XML) format, the schema may be implemented in other formats.

```xml
    <xs:attribute name="StartDate" use="required" type="xs:dateTime"/>
    <xs:attribute name="Duration" use="required">
      <xs:simpleType>
        <xs:restriction base="xs:duration">
          <xs:minExclusive value="PT0S"/>
        </xs:restriction>
      </xs:simpleType>
    </xs:attribute>
    <xs:attribute name="Resets" type="xs:boolean" default="true"/>
  </xs:complexType>
  <xs:simpleType name="CostStyleType">
    <xs:annotation>
      <xs:documentation> CostType expresses the incremental cost of a plan: -
Unrestricted: There is no incremental cost for consumption on this plan - Fixed:
Consumption goes against a quota which the user has purchased / agreed to purchase -
Variable: The user will be billed for incremental usage on this plan
</xs:documentation>
    </xs:annotation>
    <xs:restriction base="xs:string">
      <xs:enumeration value="Unrestricted"/>
      <xs:enumeration value="Fixed"/>
      <xs:enumeration value="Variable"/>
    </xs:restriction>
  </xs:simpleType>
  <xs:element name="Plan">
    <xs:complexType>
      <xs:sequence>
        <xs:element minOccurs="0" ref="Description"/>
        <xs:element minOccurs="0" ref="Usage"/>
      </xs:sequence>
      <xs:attribute name="Name" use="required" type="xs:string"/>
    </xs:complexType>
  </xs:element>
  <xs:element name="Description" type="DescriptionBaseType" abstract="true"/>
  <xs:complexType name="DescriptionBaseType">
    <xs:sequence>
      <xs:element name="BillingCycle" type="BillingCycleType" minOccurs="0"/>
      <xs:element name="Conditions" minOccurs="0">
        <xs:complexType>
          <xs:all>
            <xs:element name="Location" type="base:LocationType" minOccurs="0"/>
            <xs:element name="Time" type="base:TimeType" minOccurs="0"/>
            <xs:element name="Direction" default="inout" minOccurs="0">
              <xs:simpleType>
                <xs:restriction base="xs:token">
                  <xs:enumeration value="in"/>
                  <xs:enumeration value="out"/>
                  <xs:enumeration value="inout"/>
                </xs:restriction>
              </xs:simpleType>
            </xs:element>
            <xs:element name="Destination" minOccurs="0">
              <xs:complexType>
                <xs:annotation>
                  <xs:documentation> PhoneNumber only applies to
SMS/Voice plans; HostName only applies to data plans </xs:documentation>
                </xs:annotation>
                <xs:sequence>
                  <xs:element name="PhoneNumber" minOccurs="0">
                    <xs:simpleType>
                      <xs:restriction base="xs:string">
                        <xs:pattern value="(\+)?\d+"/>
                      </xs:restriction>
                    </xs:simpleType>
                  </xs:element>
                  <xs:element name="HostName" minOccurs="0">
                    <xs:simpleType>
                      <xs:restriction base="xs:anyURI"/>
```

APPENDIX A-continued

Listed below are exemplary schema portions that are operable in aspects of the disclosure. While written in extensible markup language (XML) format, the schema may be implemented in other formats.

```xml
            </xs:simpleType>
           </xs:element>
          </xs:sequence>
         </xs:complexType>
        </xs:element>
        <xs:element name="LimitedUsage" minOccurs="0">
         <xs:annotation>
          <xs:documentation> For Fixed plans, provides details
on the user's quota: - Limit: The amount of the quota (in minutes for Voice plans,
megabytes for Data plans, and messages for SMS plans) - SharedPlan: Another plan
name whose quota is also consumed by usage on this plan - FallbackPlan: Another
plan name whose consumption begins when this quota is exhausted. If a Fallback Plan
is not provided, the current plan goes into an Overage state. </xs:documentation>
         </xs:annotation>
         <xs:complexType>
          <xs:attribute name="Limit" use="required"
type="xs:nonNegativeInteger"/>
          <xs:attribute name="SharedPlan" type="xs:string"/>
          <xs:attribute name="FallbackPlan" type="xs:string"/>
         </xs:complexType>
        </xs:element>
       </xs:all>
      </xs:complexType>
     </xs:element>
    </xs:sequence>
    <xs:attribute name="CostStyle" use="required" type="CostStyleType"/>
   </xs:complexType>
   <xs:complexType name="DataPlanDescriptionType">
    <xs:complexContent>
     <xs:extension base="DescriptionBaseType">
      <xs:sequence>
       <xs:element name="BandwidthInKbps"
type="xs:nonNegativeInteger" minOccurs="0"/>
       <xs:element name="MaxDownloadFileSizeInMegabytes"
type="xs:positiveInteger" default="25" minOccurs="0"/>
       <xs:element name="SecurityUpdatesExempt" type="xs:boolean"
default="false" minOccurs="0"/>
      </xs:sequence>
     </xs:extension>
    </xs:complexContent>
   </xs:complexType>
   <xs:element name="DataPlanDescription" type="DataPlanDescriptionType"
substitutionGroup="Description"/>
   <xs:complexType name="SmsPlanDescriptionType">
    <xs:complexContent>
     <xs:extension base="DescriptionBaseType"/>
    </xs:complexContent>
   </xs:complexType>
   <xs:element name="SmsPlanDescription" type="SmsPlanDescriptionType"
substitutionGroup="Description"/>
   <xs:complexType name="VoicePlanDescriptionType">
    <xs:complexContent>
     <xs:extension base="DescriptionBaseType"/>
    </xs:complexContent>
   </xs:complexType>
   <xs:element name="VoicePlanDescription" type="VoicePlanDescriptionType"
substitutionGroup="Description"/>
   <xs:element name="Usage" type="PlanUsageType"/>
   <xs:complexType name="PlanUsageType">
    <xs:attribute name="PlanName" use="required" type="xs:string"/>
    <xs:attribute name="OverLimit" type="xs:boolean"/>
    <xs:attribute name="Congested" type="xs:boolean"/>
    <xs:attribute name="CurrentUsage" use="required"
type="xs:nonNegativeInteger"/>
    <xs:attribute name="UsageTimestamp" use="required" type="xs:dateTime"/>
   </xs:complexType>
</xs:schema>
```

What is claimed is:

1. A system for reducing costs associated with a data usage plan, the system comprising:
   a memory area associated with a mobile computing device, said memory area storing data describing a plurality of data usage plans, the plurality of data usage plans including a current data usage plan; and
   a processor programmed to:
      collect data usage statistics describing network data consumed by the mobile computing device under the current data usage plan, wherein the collected data usage statistics indicate a breakout of the data usage by the mobile computing device over a plurality of different types of network connections and a threshold value associated with each of the network connections, wherein the data usage statistics indicate the breakout of the data usage and the threshold value for at least a cellular connection and a Wi-Fi connection;
      compare the collected data usage statistics with the data describing each of the plurality of data usage plans stored in the memory area; and
      automatically, without input from a user of the mobile computing device, exchanging the current data usage plan for another one of the plurality of data usage plans, wherein said exchanging reduces costs associated with network data transfers by the mobile computing device.

2. The system of claim 1, wherein each of the plurality of data usage plans is stored in the memory area as an extensible markup language schema.

3. The system of claim 2, wherein the extensible markup language schema has a plurality of fields, each of the plurality of fields comprising one or more of the following: peak times, off-peak times, peak time network data consumption quota, off-peak time network data consumption quota, peak time network data consumption remaining, off-peak time network data consumption remaining, a roaming rate, a mobile operator name, a billing cycle type, and a network connection type.

4. The system of claim 1, wherein the processor is programmed to collect the data usage statistics by receiving at least a portion of the data usage statistics from a mobile operator.

5. The system of claim 1, wherein the processor is programmed to collect the data usage statistics by receiving at least a portion of the data usage statistics from other computing devices associated with the data usage plan.

6. The system of claim 1, further wherein each of the plurality of data usage plans includes a threshold value representing a maximum amount of network data consumption allotted under the data usage plan.

7. The system of claim 1, further comprising means for upgrading or downgrading the data usage plan without input from a user of the mobile computing device.

8. A method comprising:
   accessing, by a computing device, data describing a data usage plan associated with at least one computing device;
   receiving data usage statistics describing network data consumed by the at least one computing device under the data usage plan, wherein the received data usage statistics indicate a breakout of the network data consumed by the at least one computing device over a plurality of different types of network connections and a threshold value associated with each of the network connections;
   comparing the accessed data with the received data usage statistics; and
   automatically adjusting, without input from a user of the at least one computing device, one or more terms of the data usage plan based on the comparison, wherein after the adjustment, the one or more automatically adjusted terms along with expected cost savings anticipated based on the adjustment are displayed to the user of the least one computing device.

9. The method of claim 8, wherein receiving the data usage statistics comprises receiving the data usage statistics from one or more of the following: a mobile operator, and another computing device.

10. The method of claim 8, further comprising automatically upgrading or downgrading the data usage plan without input from the user of the at least one computing device.

11. The method of claim 8, wherein the data usage plan includes threshold values representing a maximum amount of network data consumption allotted under the data usage plan, and automatically adjusting the one or more terms comprises increasing at least one of the threshold values based on the comparison.

12. The method of claim 8, wherein the data usage plan includes threshold values representing a maximum amount of network data consumption allotted under the data usage plan, and wherein automatically adjusting the one or more terms comprises decreasing at least one of the threshold values based on the comparison.

13. The method of claim 8, wherein the data usage plan includes threshold values representing a maximum amount of network data consumption allotted under the data usage plan, each of the threshold values being associated with at least one network connection of the at least one computing device.

14. The method of claim 8, wherein accessing data describing the data usage plan comprises accessing an extensible markup language schema.

15. The method of claim 8, further comprising requesting opt-in consent from the user to retrieve the data describing the data usage plan from a mobile operator, wherein the at least one computing device, after retrieving the data, is synchronized with the mobile operator.

16. The method of claim 8, wherein comparing the accessed data with the received data usage statistics comprises comparing threshold values with network data consumption.

17. One or more computer storage media embodying computer-executable components, said components comprising:
   a communications interface component that when executed causes at least one processor to receive data describing a data usage plan associated with at least one computing device, the communications interface component further receiving data usage statistics describing network data consumed by the at least one computing device under the data usage plan, wherein the received data usage statistics indicate a breakout of the network data consumed by the at least one computing device over a plurality of different types of network connections and a threshold value associated with each of the network connections;
   a prediction component that when executed causes at least one processor to compare the received data with the received data usage statistics;
   a plan component that when executed causes at least one processor to automatically adjust, without input from a user of the at least one computing device one or more terms of the data usage plan based on the comparison performed by the prediction component, wherein said adjustment reduces costs associated with the network data consumption by the at least one computing device; and a user interface component that when executed causes at least one processor to present the data usage plan adjusted by the plan component to the user of the at least one computing device.

18. The computer storage media of claim 17, wherein the plan component further estimates excess data consumption charges based on the comparison performed by the prediction component.

19. The computer storage media of claim 18, wherein the prediction component further compares the received data usage statistics with at least one other data usage plan, and wherein the plan component further estimates, without user input and based on the comparison performed by the prediction component, cost savings associated with changing from the data usage plan to the at least one other data usage plan, the user interface component further displaying the cost savings along with threshold values associated with the different types of network connections for the adjusted data usage plan.

20. The computer storage media of claim 19, wherein the user interface component presents the data usage plan adjusted by the plan component by displaying the cost savings estimated by the plan component.

\* \* \* \* \*